Patented July 7, 1942

2,289,195

UNITED STATES PATENT OFFICE 2,289,195

TREATMENT OF RUBBER

Louis H. Howland, Cheshire, Conn., assignor to United States Rubber Company, New York, N. Y., a corporation of New Jersey No Drawing. Application October 21, 1939, Serial No. 300,585

10 Claims. (Cl. 260—808)

This invention relates to improvements in the treatment of rubber.

An object of the invention is to provide a method of retarding the deterioration of rubber, and particularly for retarding fatigue and cracking of rubber under static or dynamic tension, and particularly when exposed to atmospheric conditions. Another object is to provide a method of intensifying the activity of known cracking inhibitors in rubber. A further object is to provide an improved anti-oxidant composition for rubber and similar vulcanizable gums. Other objects will be apparent from the following description.

I have discovered that the tri-aryl derivatives of certain elements of group V of the periodic table have a marked retarding effect on the cracking of vulcanized rubber under various conditions. I have further discovered that remarkable improvement in the resistance of rubber to cracking may be obtained by using said derivatives in conjunction with conventional nitrogen-containing antioxidants and particularly those of the aromatic amine type.

The invention broadly comprises incorporating in rubber a tri-aryl derivative of an element of the nitrogen family of group V of the periodic table having an atomic weight of at least 31. The nitrogen family is distinguished from the vanadium family of elements of group V, which includes vanadium, niobium and tantalum (Mellor's "Modern Inorganic Chemistry"; 1922 ed.). The invention includes the use of triaryl derivatives of phosphorus, arsenic, antimony, and bismuth. The invention further comprises incorporating in rubber a triaryl derivative of the class described, in combination with a conventional antioxidant of the aromatic amine type, particularly with an antioxidant of the secondary aromatic amine type.

In the tri-aryl derivatives of the designated group V elements, the aryl groups may be simple aromatic hydrocarbon radicals such as phenyl, zenyl, alpha-naphthyl, and beta-naphthyl, or they may contain alkyl or alkoxy groups as nuclear substituents as in o-tolyl, m-tolyl, p-tolyl, xylyl, anisyl, and phenetyl. Examples of such tri-aryl derivatives included within the scope of the invention are tri-phenyl phosphine, tri-phenyl arsine, tri-phenyl stibine, tri-phenyl bismuthine; also tri-p-tolyl stibine, tri-xylyl stibine, tri-xenyl stibine, tri-alpha-naphthyl stibine, tri-beta-naphthyl stibine, tri-anisyl stibine, and tri-phenetyl stibine, and the corresponding tri-aryl phosphines, tri-aryl arsines, and triaryl bismuthines.

Of the aromatic amine antioxidants which may be used in combination with the tri-aryl compounds of the class described, those have been found especially effective which are known as flex-cracking inhibitors in their own right, viz., the secondary aromatic amines. Within this broad class are included, for example, the simple diarylamines such as diphenyl-amine, p-methoxy-diphenylamine, p-isopropoxy diphenylamine, p-allyloxy, diphenylamine, p-methallyloxy diphenylamine, p,p'-di-methoxy-diphenylamine, phenyl alpha-naphthylamine, phenyl beta-naphthylamine, phenyl tolyl amines, di-naphthylamines, p-isopropyl diphenylamine, p-isopropenyl diphenylamine, N-methyl diphenyl-p-phenylene diamine, N-ethyl diphenyl-p-phenylene diamine and the like; di-secondary aromatic amines, such as N,N'-diphenyl-p-phenylene diamine, N,N'-di-p-tolyl p-phenylene-diamine, N,N'-di-beta-naphthyl p-phenylene diamine, N,N'-diphenyl ethylene diamine, N,N'-di-p-tolyl ethylene diamine, and the like; and likewise aldehyde-amine and ketone-amine condensates of aromatic amines, for example: the products obtained by condensing aliphatic aldehydes such as acetaldehyde, aldol, or crotonaldehyde with primary aromatic amines such as aniline or alpha-naphthylamine in the presence of acid; those reaction products of aliphatic ketones as acetone and primary aromatic amines as aniline and p-amino diphenyl which are known to comprise 2,2,4-tri-alkyl dihydroquinolines (see Reddelien and Thurm, Berichte vol. 65, pp. 1511–1521 (1932)) and the resinous products obtained by heating the same with hydrochloric acid; and the condensates of aliphatic ketones with secondary aromatic amines, particularly with diarylamines, such condensates being known to comprise mixtures of secondary bases of various types including nuclearly iso-alkyl- and iso-alkenyl-substituted diarylamines, and meso-dialkyl acridanes such as meso-dimethyl acridane.

The behavior of the tri-aryl compounds of the group V elements disclosed is peculiarly novel when the compounds are incorporated in carbon black mixes such as tread stocks, in the following respect. When the tri-aryl compounds are added to conventional tread mixes containing the usual vulcanizing ingredients but containing no added amine antioxidant, the improvement in the flex-cracking resistance of the vulcanized stock is only very slight or may even be negative. Yet when, to such a stock containing a tri-aryl compound of a group V element, is also added a conventional antioxidant of the secondary aromatic amine type, and the vulcanizate is compared with one containing the conventional antioxidant only, the cracking resistance of the vulcanizate containing the new combination is found to be as much as from 30 to 100% greater than that of the vulcanizate containing the conventional anti-oxidant only. In comparison with control tread stocks containing no added flex-cracking inhibitors of any kind, the improvement in flex-cracking resistance effected by use of the new combination runs from 50 to 300% greater than is obtained by the use of the amine antioxidant only.

In the following examples illustrating the invention the base stock used being a conventional tread type of mix consisting of (all parts being by weight):

| | |
|---|---|
| Rubber | 100 |
| Carbon black | 45 |
| Zinc oxide | 5 |
| Pine tar | 2 |
| Stearic acid | 4 |
| Sulfur | 3 | to which were added accelerator, and amine antioxidants and/or tri-aryl derivatives of group V elements in the proportions indicated. The vulcanized samples, consisting of slabs having a half-round groove, were artificially aged in various ways and were then subjected to bending tests to determine their relative resistance to the initiation or growth of cracks.

*Example 1*

The accelerator used in this example was mercapto-benzothiazole, 1.0 part being used in mixes A and B, and 0.5 being used in mixes C and D. The vulcanizates, press-cured 60 minutes at 135° C., were aged for eleven days in an air oven at 70° C. and were then placed in a bending machine which repeatedly bent them through an angle of 60°. The half-life of a sample is expressed in terms of the number of kilocycles of bending required to reduce by fifty per cent the ability of the sample to support a deadweight bending load.

| | Added chemicals | Amount | Half-life |
|---|---|---|---|
| | | | Kilocycles |
| A | None | | 871 |
| B | p, p'-Dimethoxy diphenylamine | 1.0 | 1,253 |
| C | Triphenyl stibine | 1.0 | 591 |
| D | p, p'-Dimethoxy diphenylamine<br>Triphenyl stibine | 1.0<br>1.0 | 2,475 |

It is obvious that the combination used in mix D is extremely effective.

*Example 2*

Various well-known antioxidants and flex-cracking inhibitors of the secondary aromatic amine type were added to portions of the base mix both singly and in combination with triphenyl stibine. The accelerator in each case was mercapto-benzothiazole, 1.0 part being added to the mixes not containing the stibine and 0.35 part being added to the mixes containing the stibine, the amount of accelerator being thus adjusted so that all mixes cured at substantially the same rate. The vulcanizates, cured 90 minutes at 135° C., were prepared for testing by first subjecting them to ozone while bent, so as to start small cracks, and were then repeatedly flexed at a temperature of 130° F., the deflection cycle being between the angles of 15° and 60°, until the load-carrying capacity under a bending load was reduced by 50%. In the test results a longer half-life therefore connotes a correspondingly slower growth of the initial cracks.

| Amine | Amount of amine | Amount of triphenyl stibine | Half-life |
|---|---|---|---|
| | | | Kilocycles |
| None | 0 | 0 | 686 |
| Diphenylamine | 1 | 0 | 1,051 |
| | 1 | 1 | 1,812 |
| Phenyl alpha-naphthylamine | 1 | 0 | 1,027 |
| | 1 | 1 | 1,797 |
| Phenyl beta-naphthylamine | 1 | 0 | 1,473 |
| | 1 | 1 | 1,777 |
| N, N'-diphenyl ethylene diamine | 1 | 0 | 604 |
| | 1 | 1 | 1,025 |
| N,N'-diphenyl p-phenylene diamine | 1 | 0 | 1,866 |
| | 1 | 1 | 2,878 |
| Acetaldehyde-aniline (non-accelerating) | 2 | 0 | 451 |
| | 2 | 1 | 840 |
| Aldol-alpha-naphthylamine | 1 | 0 | 491 |
| | 1 | 1 | 780 |
| N-p-hydroxyphenyl morpholine | 1 | 0 | 1,267 |
| | 1 | 1 | 2,326 |
| Acetone-diphenylamine | 2 | 0 | 1,322 |
| | 1 | 1 | 2,037 |
| Trimethyl dihydroquinoline (polymerized) | 1 | 0 | 650 |
| | 1 | 1 | 944 |
| Acetone-aniline | 1 | 0 | 852 |
| | 1 | 1 | 1,445 |

*Example 3*

To a large portion of the above base mix there was added by weight 1 part of acetone-diphenylamine and 0.35 part of N,N'-diphenyl-p-phenylene diamine per 100 parts of rubber. To portions of the resulting antioxidant containing stock there were added one part (per 100 parts of rubber) of triphenyl stibine, triphenyl phosphine, triphenyl arsine, or triphenyl bismuthine respectively and sufficient mercaptobenzothiazole to cause all the mixes to cure at substantially the same rate. The vulcanizates, cured 90 and 180 minutes at 135° C., were repeatedly flexed in fresh air at 70° F., the deflection cycle being between the angles of 15° and 60°, until the load carrying capacity under a bending load was reduced by 50%. In the test results a longer half-life, therefore, connotes a correspondingly slower formation and growth of cracks.

| Chemical added to antioxidant containing base stock | Amount added | Half life 90 mins. at 135° C. | 180 mins. at 135° C. |
|---|---|---|---|
| | | Kilocycles | |
| None | | 1,079 | 670 |
| Triphenyl stibine | 1.0 | 2,015 | 1,251 |
| Triphenyl-phosphine | 1.0 | 1,225 | 1,099 |
| Triphenyl arsine | 1.0 | 1,481 | 1,030 |
| Triphenyl bismuthine | 1.0 | 1,143 | 1,107 |

The invention may be applied to improving the quality and resistance to flex-cracking of vulcanizable rubber generally, natural or artificially-prepared, and particularly such rubbers which like india rubber show a high elasticity of 100% or more at room temperatures and substantially maintain this property on storage at room temperature.

Having thus described my invention, what I claim and desire to protect by Letters Patent is:

1. A method of preserving rubber which comprises vulcanizing a rubber composition containing a nitrogen-containing anti-oxidant and in addition a compound of the formula $(R)_3 \equiv X$ where X is an element of the nitrogen family of Group V of the periodic table having an atomic weight of at least 31 and each R is an aryl radical having a carbon atom thereof directly attached to X.

2. A rubber tire tread composition having when vulcanized improved resistance to fatigue and cracking under static and dynamic tension, the rubber composition containing a nitrogen-containing anti-oxidant and in addition a compound of the formula $(R)_3 \equiv X$ where X is an element of the nitrogen family of Group V of the periodic table having an atomic weight of at least 31 and each R is an aryl radical having a carbon atom thereof directly attached to X.

3. A method of preserving rubber which comprises vulcanizing a rubber composition containing a nitrogen-containing anti-oxidant and in addition a triaryl stibine.

4. A method of preserving rubber which comprises vulcanizing a rubber composition containing a nitrogen-containing anti-oxidant and in addition a triphenyl stibine.

5. A method of preserving rubber which comprises vulcanizing a rubber composition containing a nitrogen-containing anti-oxidant and in addition a triaryl phosphine.

6. A method of preserving rubber which comprises vulcanizing a rubber composition containing a nitrogen-containing anti-oxidant and in addition a triaryl bismuthine.

7. A method of preserving rubber which comprises vulcanizing a rubber composition containing an aromatic amine anti-oxidant and in addition a compound of the formula $(R)_3 \equiv X$ where X is an element of the nitrogen family of Group V of the periodic table having an atomic weight of at least 31 and each R is an aryl radical having a carbon atom thereof directly attached to X.

8. A method of preserving rubber which comprises vulcanizing a rubber composition containing a secondary aromatic amine anti-oxidant and in addition a compound of the formula $(R)_3 \equiv X$ where X is an element of the nitrogen family of Group V of the periodic table having an atomic weight of at least 31 and each R is an aryl radical having a carbon atom thereof directly attached to X.

9. A method of preserving rubber which comprises vulcanizing a rubber composition containing an alkoxy diaryl amine and in addition a compound of the formula $(R)_3 \equiv X$ where X is an element of the nitrogen family of Group V of the periodic table having an atomic weight of at least 31 and each R is an aryl radical having a carbon atom directly attached to X.

10. A rubber composition having when vulcanized improved resistance to flex-cracking comprising a nitrogen-containing rubber anti-oxidant and in addition a compound of the formula $(R)_3 \equiv X$ where X is an element of the nitrogen family of Group V of the periodic table having an atomic weight of at least 31 and each R is an aryl radical having a carbon atom directly attached to X.

LOUIS H. HOWLAND.